United States Patent [19]

Altman

[11] 4,442,604
[45] Apr. 17, 1984

[54] PASTRY FORMING AND CUTTING UTENSIL

[76] Inventor: Ronald R. Altman, 9109 Barberry La., Hickory Hills, Ill. 60457

[21] Appl. No.: 339,112

[22] Filed: Jan. 13, 1982

[51] Int. Cl.³ .............................................. B26B 3/04
[52] U.S. Cl. ...................................................... 30/302
[58] Field of Search ................ 30/302, 303, 315, 316, 30/340, 317, 344

[56] References Cited

U.S. PATENT DOCUMENTS

| | | | |
|---|---|---|---|
| 824,445 | 6/1906 | Scott | 30/316 X |
| 2,206,316 | 7/1940 | Bartholomew | 30/302 |
| 2,249,399 | 7/1941 | Sajnaj | 30/302 |
| 2,612,123 | 9/1952 | Nord | 30/316 |
| 3,005,260 | 10/1961 | Muse | 30/302 |

Primary Examiner—Jimmy C. Peters

[57] ABSTRACT

This utensil is a combination device, which may be employed to produce deep fried rosettes or cookies, so as to prevent the necessity of the user's having a separate rosette iron and a cookie cutter of the same shaped design. Primarily, it consists of a cast metal main body, having open portions of geometrical shape, and a removable handle is secured to the center, so as to employ the device as a rosette iron. It further includes cutting edges and a design portion for forming similar impressions on the face of the product.

3 Claims, 7 Drawing Figures

U.S. Patent        Apr. 17, 1984        4,442,604
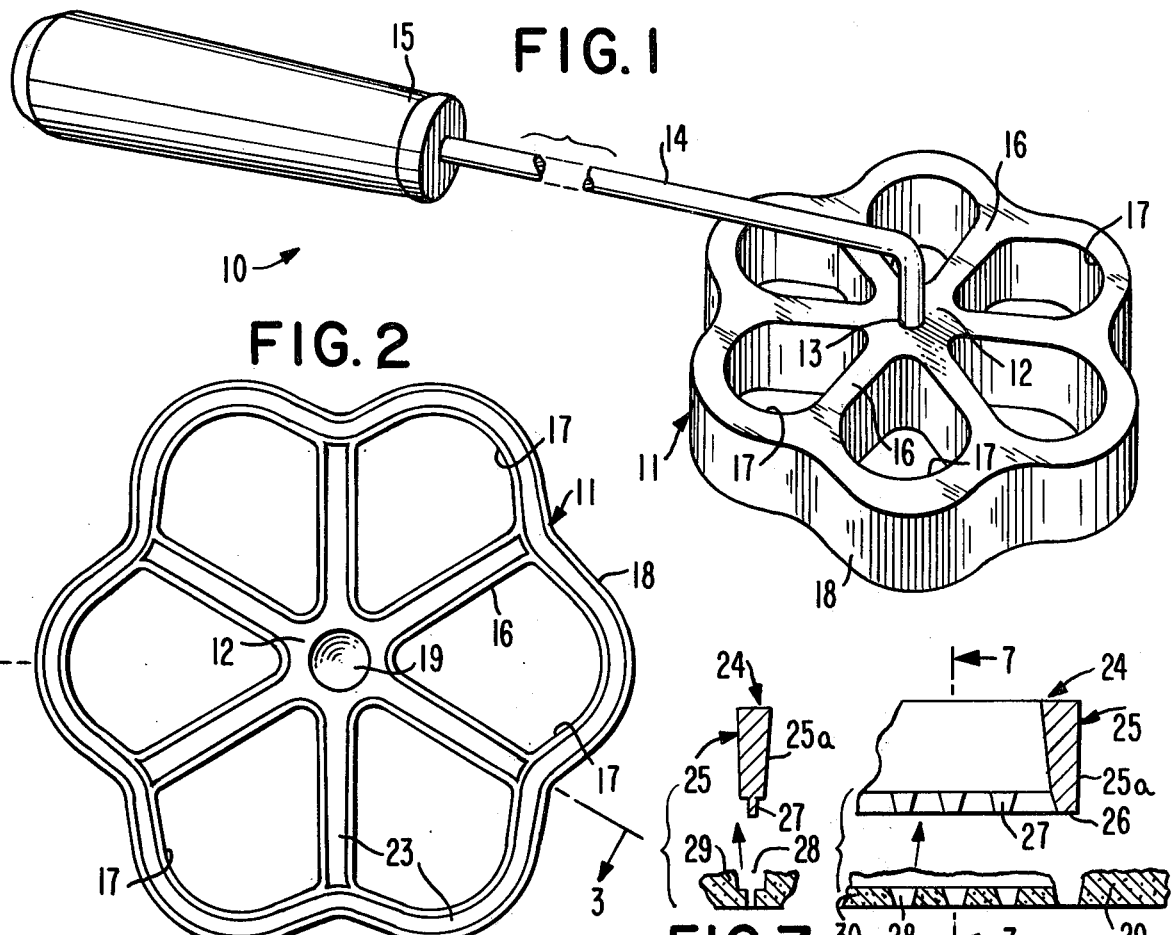
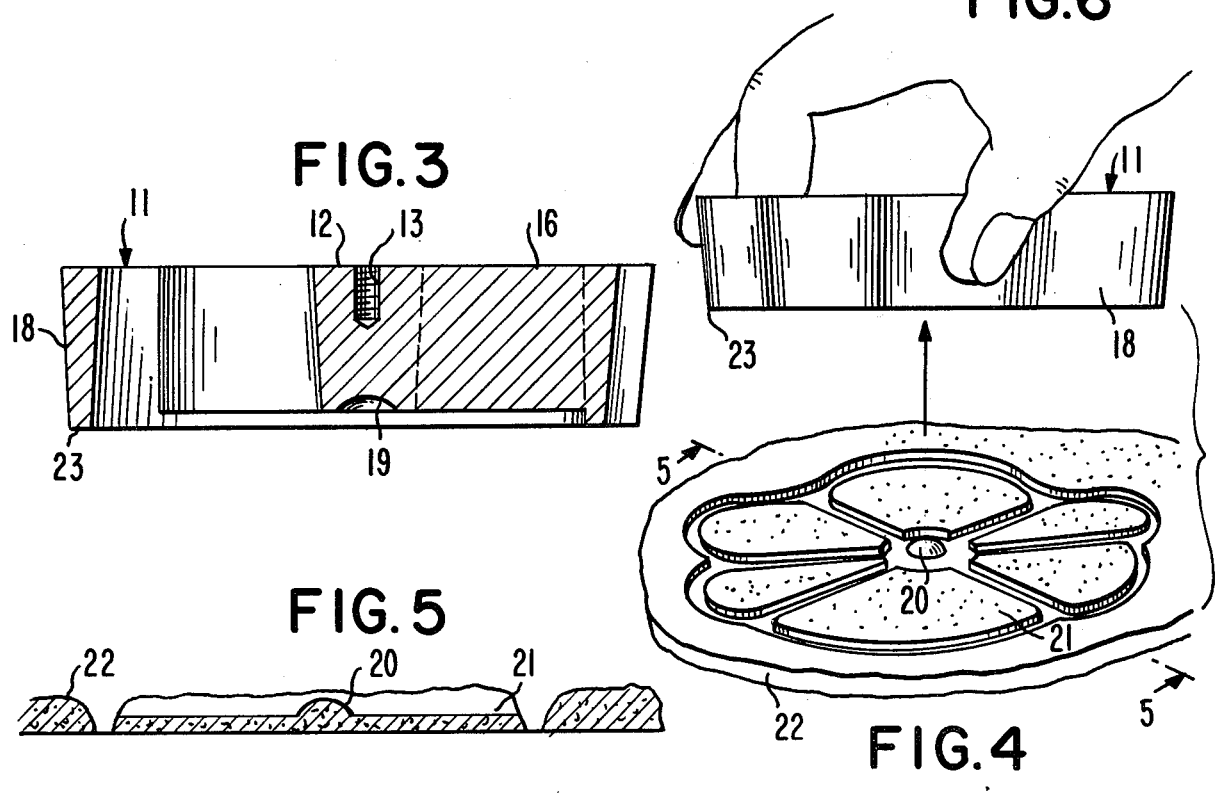

PASTRY FORMING AND CUTTING UTENSIL

This invention relates to culinary devices, and more particularly, to a pastry forming and cutting utensil.

The principal object of this invention is to provide a pastry forming and cutting utensil, which will be employed to produce a pastry, such as a rosette, that is made by dipping the utensil in batter and then placing it in a suitable cooking oil or the like. When cooking, the batter stays in the shape of the utensil, and maintains its shape after being removed therefrom.

Another object of this invention is to provide a pastry forming and cutting utensil, which will be a combination device, that will be employed as both a rosette iron, and a cookie cutter of the same design configuration, so as to prevent the former necessity of having both a rosette iron and a similarly designed or matching cookie cutter.

Another object of this invention is to provide a pastry forming and cutting utensil, which will be of such structure, as to receive removably a suitable handle, and the main body of the utensil may be of any desired configuration, other than a rosette.

A further object of this invention is to provide a pastry forming and cutting utensil, which will be fabricated of cast aluminum, and will have tapered peripheral portions, so as to enable quick and easy release of the rosette or cookie therefrom.

Other objects of the present invention are to provide a pastry forming and cutting utensil, which is simple in design, inexpensive to manufacture, rugged in construction, easy to use and efficient in operation.

These, and other objects, will be readily evident, upon a study of the following specification, and the accompanying drawing, wherein:

FIG. 1 is a perspective view of the present invention, shown assembled for producing a deep fried rosette;

FIG. 2 is an enlarged bottom plan view of the main body shown in FIG. 1;

FIG. 3 is a cross-sectional view, taken along the line 3—3 of FIG. 2;

FIG. 4 is a side elevational view of the main body, shown after forming and cutting a cookie out of rolled-out dough, which leaves an impressed design on the top of the cookie;

FIG. 5 is a cross-sectional view, taken along the line 5—5 of FIG. 4;

FIG. 6 is a fragmentary and cross-sectional view of a modified form of the invention, which includes means, additionally, to perforate a cookie, so as to enable it to be broken along a prescribed line when being divided up, and FIG. 7 is a cross-sectional view, taken along the line 7—7 of FIG. 6.

According to this invention, a utensil 10 is shown to include a main body 11 of cast aluminum or other suitable material. The central hub portion 12 includes a vertical and threaded opening 13 in the top surface of main body 11, for removably receiving one end of a suitable metal handle 14, which is secured at its opposite end in a handle grip 15 in a suitable manner. A plurality of radially and equally spaced-apart arms 16 are integrally attached to hub portion 12, and define openings 17. The opposite ends of arms 16 extend to, and are integrally attached to, the geometrically formed outer peripheral wall 18, which is continuous in structure, the combination of the arms 16 and the wall 18 forming a rosette design for creating similarly-shaped pastry. A concave recess 19 is centrally disposed in the hub portion 12 at the bottom of main body 11, and forms a nipple 20 in a cookie 21 by the handleless main body 11 in dough 22.

It shall be noted, that all of the arms 16, the hub 12, and the peripheral wall 18 are tapered at their bottoms, so as to form cutting edges 23, which free main body from dough 22.

In use, main body 11 is used with the handle 14 received in the opening 13, to create a rosette. Main body 11 is gripped by handle grip 15, and dipped into a batter, and utensil 10, with its contained batter, is placed into deep frying cooking oil or the like, which will cause the batter to harden. After the utensil 10 has been removed, the rosette created is easily removed therefrom.

When utensil 11 is to be used as a cookie cutter, the handle 14 is removed from the opening 13, and the main body 11 is held in the hand of the user to press downwards on the dough 22, to form a cookie 21.

Referring to FIGS. 6 and 7 of the drawing, a modified form of utensil 24 is shown to include a main body 25, having an outer peripheral wall 25a, which includes a bottom cutting edge 26. A plurality of spaced-apart cutting edges 27, in the bottom of main body 25, serve to create openings 28 through dough 29, so as to provide division lines for dividing up cookie 30.

In use, utensil 24 is employed in the same manner as heretofore described of utensil 10, with the exception, that more cutting edges are employed to create a cookie 30, that may be easily divided along a prescribed line.

While various changes may be made in the detail construction, it is understood that such changes will be within the spirit and scope of the present invention, as is defined by the appended claims.

What is claimed as new is:

1. A pastry forming and cutting utensil, comprising, in combination, a main body having a central hub portion, a geometrically-shaped, peripheral endless wall in spaced relation around said hub portion, a plurality of equally spaced-apart arms extending radially between said hub portion and said endless wall forming together a unitary member in a single flat plane, with openings being formed between said arms, said body defining a rosette design, said hub portion, said peripheral wall and said arms being cross-sectionally tapered between one flat side of said main body and an opposite flat side thereof, whereby a face of one said sides is narrower in width than a face of the other said side, said narrower face forming a cutting edge when said main body is impressed in a rolled out dough for cutting out cookies therein, said cutting edge of said arms comprising a row of spaced-apart, plurality of additionally narrowed teeth whereby only said teeth cut fully through said dough while intermittent spaces formed between said teeth serve only for said arms to impress a continuous design of said arms in an upper surface of said rolled out dough; and a selectively detachable handle for said main body being screw-threaded in a threaded opening on a wider said face of said hub portion.

2. The combination according to claim 1, wherein a concave recess is defined in the center portion of the recessed area extending between said continuous cutting edge, for forming a raised tit on the top surface of said dough.

3. The combination according to claim 2, wherein said outer peripheral wall and said cutting edge of said base include a coarse peripheral surface when casting said main body, for providing retainment of said batter.

* * * * *